United States Patent [19]
Yun

[11] 3,840,809
[45] Oct. 8, 1974

[54] NON-DESTRUCTIVE MEASUREMENT OF DIELECTRIC PROPERTIES

[75] Inventor: Bob Hong Yun, Essex Center, Vt.

[73] Assignee: International Business Machines Corporation, Armonk, N.Y.

[22] Filed: Dec. 4, 1972

[21] Appl. No.: 312,249

[52] U.S. Cl. .......................... 324/158 D, 324/60 R
[51] Int. Cl. ....................... G01r 31/26, G01r 27/26
[58] Field of Search ............ 324/158 D, 60 R, 60 C

[56] References Cited
UNITED STATES PATENTS

| | | | |
|---|---|---|---|
| 2,790,141 | 4/1957 | Geppert | 324/57 |
| 2,863,119 | 12/1958 | Davis, Jr. | 324/158 |
| 3,287,637 | 11/1966 | Keller | 324/62 |
| 3,290,179 | 12/1966 | Goulding | 148/1.5 |

OTHER PUBLICATIONS
Sylvan, T. P., "Measurement of . . "; Electronics; June 28, 1965; pgs. 84–88.

*Primary Examiner*—Alfred E. Smith
*Assistant Examiner*—Ernest F. Karlsen
*Attorney, Agent, or Firm*—Francis J. Thornton

[57] ABSTRACT

An apparatus for measuring certain properties of dielectric materials such as the net charge injected into the dielectric and the centroid of the distribution of the net charge by monitoring simultaneously the amount of charge injected into the dielectric material, from a charge injection source, and the corresponding change in the voltage required to restore the surface potential of the charge injector to its original state.

15 Claims, 7 Drawing Figures

NON-DESTRUCTIVE MEASUREMENT OF DIELECTRIC PROPERTIES

The apparatus is based on a complete system composed of voltage sources for impressing two distinct superimposed voltages across the dielectric, one voltage being periodic and the other non-periodic, a charge injection source which in conjunction with the applied voltages establishes in the material a selected distribution of charges, a circuit for measuring over a selected time interval, the net charge injected into the dielectric, a circuit for simultaneously measuring the change in the non-periodic voltage required to restore the surface potential of the charge injector to its original state and finally a circuit which displays these measurements in terms of the position of the centroid of the distribution of the net charge in the dielectric.

The described apparatus can be used to selectively position the centroid of charge in the material and in a special case where composite dielectric materials are used their respective thicknesses can be determined in a non-destructive manner with unprecedented accuracy.

BACKGROUND OF THE INVENTION

1. Field of the Invention

This invention relates generally to an apparatus and a method for measuring the properties of dielectric materials by measuring simultaneously the amount of charge injected into the dielectric and the voltage required to restore the surface potential of the charge injector to its original state.

2. Description of the Prior Art

In the "Journal of Applied Physics," Vol. 40, No. 8, July, 1969, there is discussed the charge transport and storage of charge carriers in metal-nitride-oxide (MNOS) semiconductor structures. This paper discusses a physical model for non-volatile semiconductors such as the MNOS type device which is based on the presence of a steady state current flow in the dielectric structure with all charge accumulation occurring at the interface of the oxide and the nitride.

U.S. Pat. No. 3,638,078 describes a voltage variable capacitor comprising a semiconductor having dual dielectrics on a surface thereof and teaches that electrical charges can be stored in the device and that the capacitance of the device is responsive to the polarity and quantity of the applied voltage.

In the "RCA Review" in June, 1969, E. C. Ross and J. T. Wolmark proposed a theory of the switching behavior of MIS memory transistors. This paper also is based entirely on the assumption that charge transport occurs between the oxide-nitride interface and the semiconductor.

C. A. I. Salamar and G. W. Taylor in the "Journal of Physics, Scientific Instruments," 1970, Vol. 3, on pages 558 thru 560 discusses a system for the automatic measurement of charge storage in the MNOS memory structures. The apparatus described is based on the assumption discussed above and does provide some charge storage measurements and utilizes a feedback loop to speed up the measurements. No teaching was made by these authors to even suggest that these measurements could be obtained by any other method nor did they teach any method that would determine the position of the centroid of charge in the dielectric.

SUMMARY OF THE INVENTION

Broadly speaking, the present invention teaches a technique and an apparatus for reliably measuring the amount of charge injected into dielectric materials and the position of the centroid of the distribution of the net charge injected with respect to a surface of the dielectric material.

The apparatus can be utilized for determining the thickness of each dielectric in multi-layerd dielectrics in a non-destructive manner.

The apparatus can also be used to selectively position the centroid of the distribution of the net charge injected into the material.

Further when non-volatile semiconductor devices are used as memory devices, the invention can be used to selectively modify the memory characteristics of such devices.

Another feature of the invention is that by so selectively placing the charge in the insulator one can selectively vary its overall capacitance.

Still another feature of the invention is that the described circuit can be utilized to establish the direction of the charge injection; i.e., whether the charge is injected from one electrode or the other.

The present invention is best realized through the use of an apparatus for applying a D.C. voltage pulse, having an A.C. voltage superimposed thereon, across a body of dielectric material which is joined to a charge injection source, for measuring, with a circuit coupled to the charge injection source, over a selected time interval, the net charge injected from the source into the dielectric and simultaneously measuring, with a different circuit, the corresponding change in voltage required to restore the surface potential of the charge injector to the state it was in prior to the application of the D.C. voltage pulse. These measurements are then used, by feeding them into an additional circuit, to determine the centroid of the distribution of the net charge injected into the dielectric and its position in the dielectric. By repeatedly pulsing the body with different voltages for different periods of time, the centroid of charge can be selectively placed at any desired position in the dielectric body. This selective placement of the charge can be used to selectively vary the characteristics of a non-volatile semiconductor device. By positioning the centroid of the distribution of the net injected charge at the interface between the layers of two different dielectrics, the thickness of each of the layers of dielectric material can be obtained.

DESCRIPTION OF THE DRAWINGS

These and other features, advantages and objects of the present invention will be more fully appreciated from the following detailed description of a preferred embodiment of the invention taken in conjunction with the accompanying drawings in which:

FIG. 4b depicts the output of the capacitor-voltage measurement circuit for the same pulses as used to produce FIG. 4a.

DESCRIPTION OF THE PREFERRED EMBODIMENT

Figure 1:
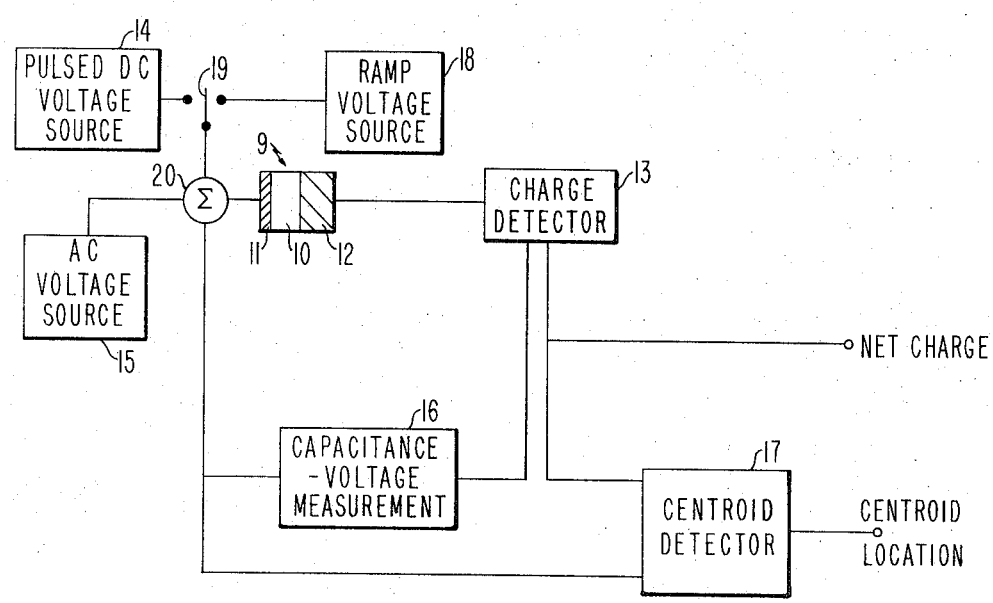
FIG. 1 illustrates in functional block form a complete system employing the present invention.

Referring now to the drawings, an apparatus employing the present invention will be described in detail as to its construction and operation.

To fully appreciate the invention a brief discussion of charge injection and trapping insulators may be appropriate before any detailed description of the invention is given.

Generally speaking, upon application of a sufficient voltage across a dielectric body having electrodes attached thereto, a small but finite current can be made to flow in the dielectric. This current comprises a flow of charge carriers, say, electrons, whose energy states have been raised high enough to put them into the conduction band of the dielectric. Once in the conduction band, they are able to flow freely within the dielectric under the influence of the applied voltage. At the same time, if the applied voltage is sufficiently high and of correct polarity, carriers will be injected across the electrode-dielectric interface into the conduction band of the dielectric and there they, being electrons, travel toward the positively biased electrode. Some of the carriers, so injected, will in their passage through the dielectric become trapped in appropriate trapping states existing in the dielectric body. Such "traps" may be due, for example, to defects, inclusion or foreign particles in the dielectric body itself.

Due to non-uniformity in the distribution of traps, there can be more charges in one region of the dielectric over that of other regions within the dielectric. Due to thermal excitation and the influence of the applied voltage, there will be an exchange of charges between the trap states and the conduction band. The charge distribution within the dielectric is, of course, a function of the applied voltage and the spatial distribution of traps relative to the injection source of carriers, as well as its distribution in energy levels.

By controlling the amount and time of the injection of charge into a dielectric one can vary the number of trapped carriers and control their location and especially control the centroid of the distribution of the net trapped charge and thereby alter the capacitive properties of the dielectric.

When one of the electrodes is a semiconductor body the charge injected can be either holes or electrons. Holes and electrons have different mobilities, injection co-efficient, trapping level, rates of decay, etc. Thus the use of injected holes will cause the charge to be trapped at different positions, cause different changes in relative electrical properties of the same dielectric under the same pulsing conditions. Thus for the same dielectric the same magnitude pulse will have different results depending on whether holes or electrons are being injected.

When the dielectric body is a dual dielectric combination now used, for example, in the so-called MNOS non-volatile semiconductor device, the same situation as described above generally holds true. However, here because of the differences in the trap densities of the two materials and their relative thicknesses, substantially all the trapping occurs in the silicon nitride and only a very minimal amount, if any, of trapping occurs in the silicon dioxide. In fact, for all practical purposes where the silicon dioxide layer is less than 100 Angstroms in thickness, it can be assumed that no trapping occurs in the thin silicon dioxide layer.

Considering the case for such an MNOS structure where the injector is an N-type semiconductor and a sufficiently high positive pulse is applied at the electrode, electrons are removed from the surface of the semiconductor and injected into the nitride via tunnelling through the thin layer of oxide. When the pulse is now removed, the electrons, which were injected prior to the termination of the pulse and are now trapped in the nitride, attract holes in the semiconductor towards the oxide-semiconductor interface. This change in charge polarity as well as in density causes, in turn, changes in the differential capacitance and the associated flat-band voltage of the semiconductor-dielectric structure. The flat-band voltages before and after the pulsing can now be used to indicate the storage of a binary "1" and "0."

A dielectric 10 under test, is shown in FIG. 1 and has an electrode 11 on one surface thereof and a charge injection source 12 on the opposite surface thereof. Coupled to this charge injection source 12 is a charge detector circuit 13 capable of measuring the amount of net charge injected into the dielectric 10 when a D.C. signal, in form of a pulse from source 14 having a superimposed A.C. voltage signal from source 15, and a feedback signal from the detector 13, as modified by a capacitance measurement circuit 16, is impressed upon the electrode 11. This impressment of these signals on the electrode 11 causes charges to be injected into the dielectric from the charge injection source 12. The distribution of the injected charges will have a centroid of distribution being established by the magnitude of the D.C. pulse applied and the duration of the pulse. It should be understood that since the distribution of charge need not be gaussian the centroid need not be the geometric center of the distribution.

The output of the charge detector 13 which is directly proportional to the charge injected into the dielectric 10 from the injector 12 is coupled to the measurement circuit 16 which measures the capacitance of the combined dielectric 10, electrode 11 and injector 12 structure and provides a voltage output representative of a change in the initial state of the surface of the charge injector 12 caused by the application of the signals from sources 14 and 15 to the electrode 11. This output of the circuit 16 is fed back to electrode 11 to restore by capacitive action the surface potential of the charge injector 12 to its original state.

The outputs of both the charge detector circuit 13 and the voltage capacitive measuring circuit 16 are fed into a detector circuit 17 which determines the location of the centroid of the distribution of the injected charge in the dielectric body with respect to the interface of the electrode and the dielectric.

When the thickness of the total dielectric is 1,000 Angstroms or less and the charge injector is a semiconductor body the pulse D.C. voltage source 14 should be capable of applying from 0 to 60 volts over a time period of from 0 to 500 milli-seconds. Of course, other sources having voltages and durations of greater or lesser value will be used when different thicknesses or materials are used. The A.C. voltage source 15, in the particular embodiment described here, has a 100 K.C. output ± 20 mv. A.C., sources of other appropriate frequencies and amplitudes can, of course, be used.

Injection of charges from the charge injector into the dielectric causes changes in charge in the charge-injector and in the fast surface states at the interface between the insulator and the charge-injector. It should be emphasized that these changes in charges are also detected by the charge-detector 13, in addition to the charge trapped in the insulator, if proper procedures are not taken. Thus, in order to have a true reading of the amount of trapped charge in the dielectric after the pulse, it is necessary that the initial condition of the surface of the charge injection be re-established to its original condition so that the actual amount of net charge trapped in the dielectric can be measured with accuracy.

Referring now to FIGS. 2 to 6, the invention will be described in greater detail.

THe electrode 11, on the dielectric 10, is coupled to a summing circuit 20. Into this summing circuit 20 is fed a signal from the A.C. source 15, a signal from the capacitance-voltage measurement circuit 16 and through switch 19, either a signal from the pulsed D.C. source 14 or from a ramp voltage source 18. The charge injector 12 is in turn coupled to the negative input 21 of an operational amplifier 22 which has a variable capacitor 23 connected between the input 21 and the output 24 of the operational amplifier 22. This capacitor causes the amplifier 22 to integrate the signal at the input 21. Coupled in parallel with the capacitor 23 is a resistor 25 and a switch 26. The output 24 is, in turn, connected to a phase locking amplifier 27 whose output is connected to a linear amplifier 28. The output of the linear amplifier 28 is in turn, connected through a resistor 29 to the negative input 30 of another operational amplifier 31 and through a resistor 32 to a variable voltage source 33. The operational amplifier 31 also has a capacitor 34 coupled to its input 30 and its output 35 to cause it to act as an integrator. Also coupled across the amplifier 31 in parallel with the capacitor 34 is a resistor 36 and a switch 37. The output 35 of amplifier 31 is connected into the summing circuit 20 and via lead 57 to another summing circuit 38 and to two divider circuits 39 and 45 in the centroid detector circuit 17.

The output 24 of the operational amplifier 22 is also connected to an inverting summing circuit 41. Into the summing circuit 41 is also coupled an integrator 42 whose output 42a is adjusted by a voltage source shown as battery 44 coupled to its input 42b, to be equal and opposite to any leakage that may be detected at output 24.

The output 40 of summing circuit 41 is then fed to the summing circuit 38 and the divider 39. The output of the summing circuit 38 is coupled together with the output 35 of the operational amplifier 31 to another divider circuit 45 whose output is in turn connected to a motor 46 connected to drive a variable voltage source 47 so that a variable voltage output, proportional to output of divider circuit 45 will be fed into a multiplier amplifier 50 which is receiving an input from divider circuit 39. The output 51 of this variable gain amplifier 50 is measurement of the position of the centroid of charge.

The above described circuit operates as follows: a pristine structure, immediately after its construction, is placed in the circuit and its capacitive-voltage curve, commonly known as a C.V. plot is obtained. To accomplish this the switches 19, 26 and 37 are closed and the capacitor 23 is set to the expected maximum capacitance of the structure. Closing switch 19 couples the ramp voltage source 18 to the summing circuit 20 and the pulsed D.C. source 14 is disconnected therefrom. Closing of switch 26 prevents the output of amplifier 22 from saturation caused by an excessive conduction current through the dielectric 10 at peak ramp voltage. However, the resistor 25, relative to capacitor 23, is chosen such that this R.C. combination allows amplifier 22 to continue to act as an integrator at the frequency of source 15.

Closing of switch 37 keeps the output 35 of amplifier 31 at zero so that it will not interfere with the obtaining of this C.V. plot. The output of this ramp voltage source 18 varies from, say, −30v to +30v volts. This ramp voltage is now fed into summing circuit 20 together with the sinusoidal signal, from the A.C. voltage source 15 where they are summed and applied to the electrode 11. The application of such a combination of voltages to the electrode 11 causes a current flow into the charge injector 12. This current flow is detected at the input 21 of the operational amplifier 22 which is coupled directly to the charge injector 12. This operational amplifier 22 by virtue of a negative feedback arrangement through the capacitor 23 serves to integrate the current flow detected at its input 21. The output 24 of the operational amplifier 22 thus provides a signal which is the integral equal of the flow caused by carriers being injected into the charge injector 12. This signal is then applied to the phase-locking amplifier 27 whose output is proportional to the RMS value of the response of the device to the 100 kilocycle A.C. signal applied thereto. Thus the output of this phase-locking amplifier 27 is proportional to the capacitance of the structure which has been changed by the ramp voltage.

The output of this phase-locking amplifier is then fed into a linearizing amplifier 28 whose output is set to equal 1 volt for each 100 pf of capacitance. The output of the linear amplifier 28 is thus a measurement of the capacitance of the structure and is plotted, in FIG. 3, against the applied ramp voltage as curve 60. The capacitor 23 is now reset to exactly equal the maximum capacitance Co of the structure and if necessary the amplifier 28 is also re-adjusted to again linearize its output; i.e., it is set to again equal 1 volt for each 100 pf of capacitance.

Figure 3:
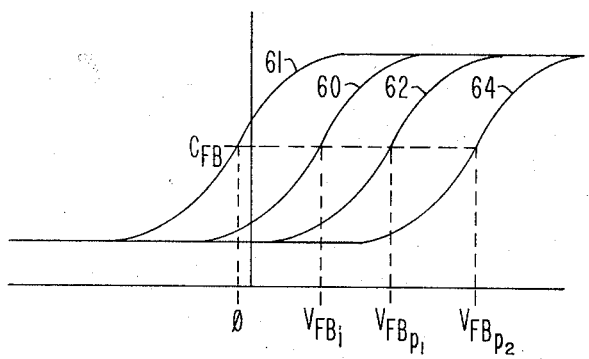
FIG. 3 illustrates the capacitance voltage plot of the device.
Figure 2:
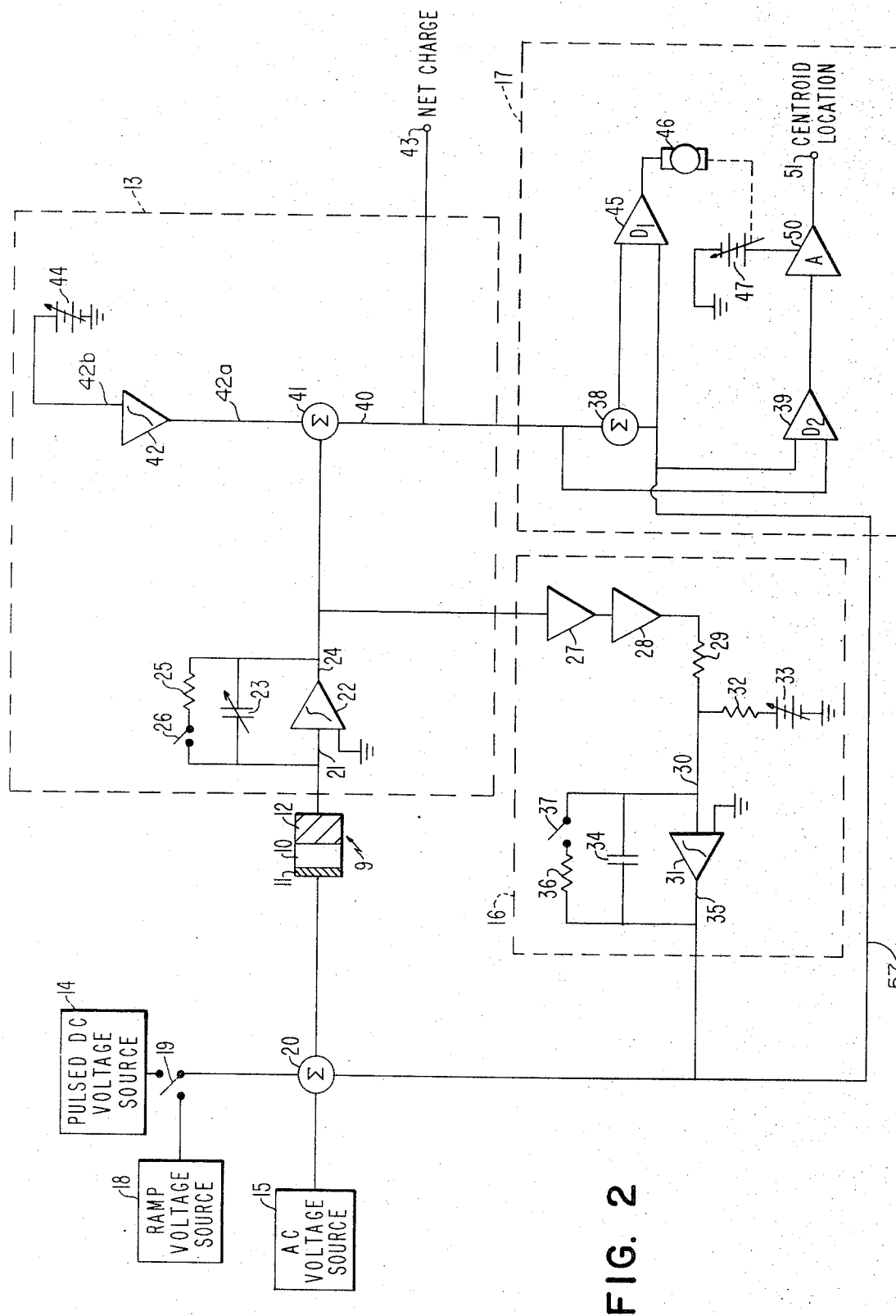
FIG. 2 illustrates in schematic form a complete system of the invention.

As is well known in the semiconductor art the flat band capacitance generally is thus measured; i.e., a ramp voltage is applied to the device to get a high frequency C-V plot as shown in FIG. 3 as curve 60. From this high frequency C-V plot the point of maximum slope is located. This point is, by definition, the flat band capacitance shown in FIG. 3 as CFB and the voltage at which it occurs is the flat band voltage. In an ideal insulator in which no charge has been trapped during the creation of the insulator or by previous electrical treatments, the work function difference $\phi$ between the electrode and the charge injector is equal to the flat band voltage. The work function, difference between the electrode and the charge injector is, of course, readily calculable since the work function of the respective materials are well known physical constants. However, since insulators may not be free of charges either due to the manufacturing techniques or because of previous testing during the manufacture, the initial flat band voltage VFBi, originally measured, from curve 60, may not be equal to this work function difference. In FIG. 3 curve 60 illustrates such a case; i.e., where the initial flat band voltage VFBi is not equal to the work function difference $\phi$. For optimum use of this invention, it is desirable that the initial flat band voltage VFBi of the structure be set to be equal to the work function difference $\phi$ of the two materials. These are set equal by removing any initial charge of consequence contained in the insulator by applying to the device a D.C. pulse of polarity opposite to the polarity of the initially measured flat band voltage VFBi to shift along the voltage gradient until it equals the calculated work function difference $\phi$ between the electrode and the charge injector. For example, let us assume that for a particular device the flat band capacitance CFB is 400 picofarads and the initially measured flat band voltage was say +2 volts. Again let us assume with a work function difference between the electrode and the charge injector is equal to −0.2 volts. To set these values equal it is necessary that negative D.C. pulses be applied across the structure to cause the measured C.V. curve 60, and thus the measured flat band voltage, to shift to the left and coincide with curve 61. Thus at this time the output of amplifier 28 is equal to 4 volts, since CFB is 400 picofarads. An equal voltage of opposite polarity is, by an adjustable battery 33 and resistor 32, now applied to the input 30 of the amplifier 31. Switch 37 is now opened and switch 19 is set to couple the D.C. source 14 to the summing circuit 20 and the starting level of source 14 set to assure the output 35 of amplifier 31 is zero.

At this time the structure is now in a condition to have a measured injection of charge established and positioned therein. This is accomplished in the following manner: Switch 19 is set to couple the D.C. voltage source 14 to the summing circuit 20 and disconnect the ramping voltage source 18. Switch 26 across amplifier 22 is opened and switch 37 across amplifier 31 remains closed. A pulse say, for example, +18 volts having the time period of 2 milliseconds is applied from the pulsed D.C. source 14 to the summing circuit 20 together with the A.C. signal from the source 15. These two signals are summed and applied to the electrode 11 causing charge injection into the dielectric 10. This causes the C-V curve of the device to shift and is shown in FIG. 3 as curve 62. This establishes a new flat band voltage VFBP1. Thus a current flows into the charge injector 12. This in turn gives rise to a voltage at the input 21 of the operational amplifier 22. Negative feedback through the capacitor 23 now begins. This negative feedback operates to cause the input 21 of the operational amplifier 22 to be driven back towards ground. The operational amplifier 22 thus integrates its input. Because capacitor 23 was set equal to the maximum of accumulation capacitance Co obtained from the C-V plot of the device, the subsequent electronics circuitry is simplified.

Figure 4A:
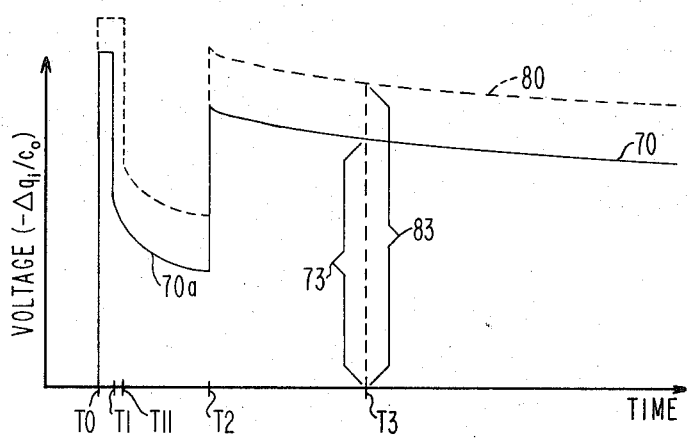
FIG. 4a depicts the output of the charge detector circuit of the invention for a pulse having a particular D.C. voltage level with different time durations.

The integrated output of the amplifier 22 is now fed through the phase-locking amplifier 27 and the linear amplifier 28. The output of the linear amplifier 28 is thus changed because the C-V curve of the device has been shifted. This new output of amplifier 28 is applied to the input 30 of the second operational amplifier 31. Because switch 37 across this operational amplifier 31 is closed the output of amplifier 31 remains zero. The output of the operational amplifier 22 created by the application of such a pulse when taken at point 43 is shown in FIG. 4a, as solid line 70, by recording the voltage output at 43 as a function of time.

For purposes of example only, the curve 70 is assumed to depict the results of an 18 volt pulse applied for a period of 2 milliseconds to the electrode 11 by source 14.

Thus at time T0 when the pulse is applied to the structure the output taken at point 43 rises sharply. At time T1 the pulse is shut off and the output decays and is shown by portion 70a, of curve 70. Because of the trapped charges, the change in output does not return to zero. Instead it decays rather slowly. At T2 the switch 37 across amplifier 31 is opened and the amplifier 31 now begins to integrate the signal applied to its input 30 and produces the signal shown in FIG. 4b as curve 71 which is the change in the flat band voltage from $\phi$ to VFBP1, as shown in FIG. 3, as a function of time. This voltage is applied to the electrode 11 through the summing circuit 20 to force the surface of the charge injector 12 back to its original condition. When this new flat band voltage is applied to the electrode 11 the surface potential of the charge injector 12 is restored to its original state. Thus the change in charge in the injector 12 and the fast surface states at the interface between the dielectric 10 and injector 12 becomes zero. The rise in curve 70 at time T2 in FIG. 4a corresponds to the impressment of the new flat band voltage on electrode 11. At some time after T2; i.e., T3 the voltage at point 43 shown by bracket 73 is measured. This measured value is directly proportional to the injected charge $\Delta qi$ and inversely proportional to the maximum capacitance Co. Simultaneously the flat band voltage is also measured as shown by bracket 74 in FIG. 4b. Measurement 74 is then substracted from measurement 73 and the result plotted against measurement 74 to provide a single point 75 on a curve 76 as shown in FIG. 5.

Of course, it is understood that the applied D.C. pulse from source 14 is always maintained at a low enough level and/or time duration such that the D.C. conduction current through the insulator does not contribute any significant error to these measurements.

The circuit is now restored by closing switches 26 and 37 and pulsing the structure to restore its flat band voltage to $\phi$ as taught above.

The circuit is now ready for a new pulse by repeating the above sequence; i.e., opening switch 26, etc.

Figure 4B:
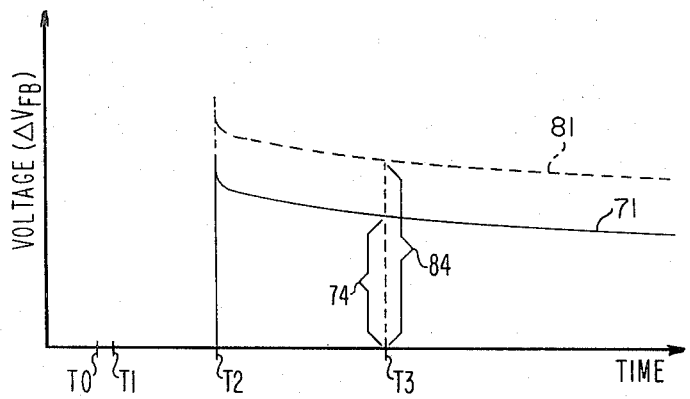
Figure 5:
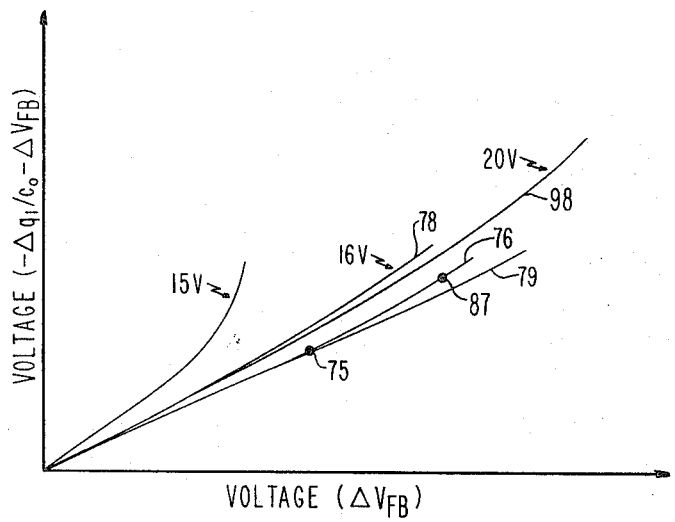
FIG. 5 is a plot of various D.C. pulses applied to the device under test to show that the centroid of the distribution of charge moves through the dielectric body.

Dashed curve 80 of FIG. 4a and dashed curve 81 in FIG. 4b are obtained by repeating the sequence with a pulse of the same voltage but a different time duration; i.e., an 18 volt pulse of 5 ms duration. Thus the C-V curve is shifted to curve 64 and a new flatband voltage VFBP2 results. Thus again at T0 the source 14 is connected to the summing circuit 20 and the pulse applied. At time T11 this longer time pulse is shut off. At time T2 the switch 37 is again opened and at time T3 measurements are again made. This time the measurements are indicated by brackets 83 and 84 in FIGS. 4a and 4b, respectively. This results in a new data point 87 on curve 76.

FIG. 5 thus shows a family of curves so obtained for a structure by applying different voltages of different time durations. Thus curve 76 represents the 18v curve while curve 78 represents the 16v curve and curve 79 represents the 19v curve.

The output of divider 39 is $\Delta VFB$; i.e., the measurement indicated by bracket 74 of FIG. 4b divided by $(-\Delta qi/co)$; i.e., the measurement indicated by bracket 73 of FIG. 4a. This means that for a single layer dielectric the output of divider 39 is the centroid of the injected charge distribution divided by the thickness of the dielectric.

If the polarity of the D.C. pulse from source 14 applied at electrode 11 is negative and of sufficient amplitude, electrons are injected into the dielectric from the electrode. Further if the injector 12 is a semiconductor holes are injected from it.

If at time T2 when switch 37 is opened and the surface of injector 12 restored to its original state, as taught above the output at point 43 drops to zero indicating that charge injection from injector 12 did not occur and that any charge injection that did occur was from the electrode 11.

However, if at this time T2 the curve rises only slightly charge injection from the injector 12 is measured.

Figure 6:
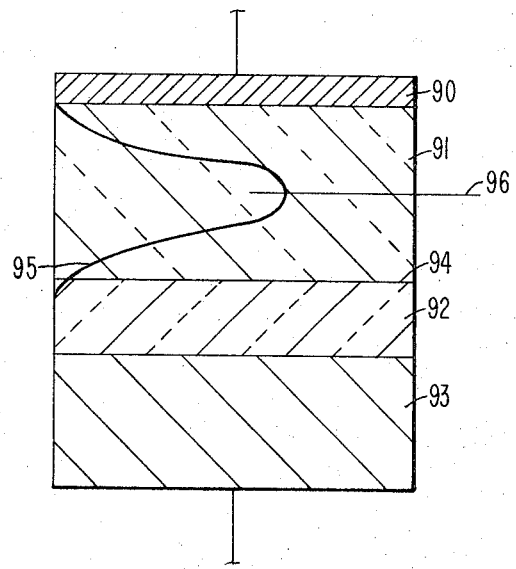
FIG. 6 illustrates a sectional view of a dual dielectric non-volatile semiconductor device.

FIG. 6 shows a double layer dielectric structure where the electrode 90; for example, aluminum, is applied to a dielectric layer 91, for example 500 Angstroms of silicon nitride, which is overlying a different dielectric layer 92, for example 25 Angstroms of silicone dioxide, deposited on a charge injector 93, for example N-type silicone.

When charge is injected into such a structure, as taught above, it is substantially distributed in the layer 91. One such distribution is shown as curve 95 with its centroid indicated by line 96.

By moving the centroid to the interface 94 between the two dielectrics one can measure non-destructively the thickness of the layer 92 with unprecedented accuracy.

As noted previously the measurements indicated by brackets 73 and 74 and 83 and 84 can be plotted as points 75 and 87 on curve 76 and that by plotting a sufficient number of such points and by using different magnitudes of voltage a family of curves can be plotted.

When such curves are plotted as shown in FIG. 5, it can be seen that curve 76, based on an 18 volt pulse, is further from the abscissa of the plot than is curve 79 which is based on a 19 volt pulse. Also as shown the curve 98, based on a 20 volt pulse, is further from the abscissa than is curve 79. Thus the 19 volt curve 79 of this family of curves possesses, for this family, the minimum slope drawn from the origin. When this occurs in a dual dielectric structure such as shown in FIG. 6, it indicates that this magnitude of voltage has caused the centroid of charge to be located at the interface 94 of the two dielectrics. Centroid as used herein refers to a plane with respect to which the moment of the charge distribution is zero. Any measurement made to obtain a point on the curve having the minimum slope, causes the output of divider 45 to be the minimum slope and the thickness of the oxide can be determined because the thickness is related to this minimum slope as shown in the following equation:

$$Tox = (BEox/Co)(Sm/Sm + 1)$$

When
- $Tox$ = thickness of oxide
- $Eox$ = permittivity of oxide
- $Sm$ = the minimum slope
- $Co$ = measured capacitor of the structure and
- $B$ = the area of electrode 11

As noted previously for a single layer dielectric the output of divider 39 was directly related to the position of the centroid of charge and inversely related to the thickness of the dielectric. This is also substantially true for dual dielectric structures when one is very thin compared to the other.

For a very accurate measurement, in dual dielectric structures, of the location of the centroid of charge, injected from the injector, relative to the surface of the electrode, it is necessary that the output of divider 39 be multiplied by $(1 + Sm)$. This is accomplished by feeding the output of divider 39 into the multiplier 50 whose mulitiplication factor has been set by the servomechanism 46 and voltage source 47 to be $(1 + Sm)$. Thus the output 51 of multiplier 50 is the centroid location of the injected charge relative to the electrode 90 divided by the thickness of the nitride; i.e., $\overline{X}/tn$ where

- $\overline{X}$ = centroid location and
- $tn$ = thickness of the silicon nitride It can be shown that $$tn = (1/Sm)[1/(Eox)/(En)](Tox)$$

where $En$ = permittivity of silicon nitride. Thus the centroid location $\overline{X}$ can be determined.

It is of course obvious that other dielectrics than those named such as alumina etc. can be used.

While the invention has been particularly shown and described with reference to the preferred emobdiment thereof, it will be understood by those skilled in the art that various changes in form and details of the apparatus and method may be made therein without departing from the spirit and scope of the invention and that the method is in no way restricted by the apparatus.

What is claimed is:

1. An apparatus for determining the position of the centroid of the distribution of charges in a dielectric comprising:
   a source of charges
   means injecting said charges into the dielectric from said source,
   means coupled to the dielectric for measuring the amount of charges injected into the dielectric, and means coupled to the charge measuring means for converting the measured amount of charges injected into the dielectric into a measurement of the centroid of the distribution of the charges injected into the dielectric.

2. The apparatus of claim 1 wherein said measuring means includes means for utilizing the measured amount of injected charges to determine the capacitance of the dielectric.

3. An apparatus for determining the location of the centroid of charges in a dielectric structure comprising:

a dielectric structure having a first surface and a second surface, a source of charges coupled to the first surface of the structure, voltage means for applying a distinct D.C. voltage across the structure and the source of charges to cause charges to be injected into the structure from the source, charge detector means coupled to the source for measuring the amount of charge injected into the structure, capacitance measuring means coupled to the source for measuring the change in capacitance in the structure caused by the injection of said charges, means for applying a voltage corresponding to said measured change in capacitance across the structure and the source, and means coupled to said charge detector means and said applying means for determining the location of the centroid of the distribution of charges in the dielectric with respect to the second surface of the dielectric.

4. Apparatus of claim 3 wherein said source of charges is a semiconductor.

5. The apparatus of claim 3 wherein said voltage means comprises a source of D.C. pulses and a source of A.C. signals.

6. The apparatus of claim 3 wherein said charge detector means comprises an integrating operational amplifier ohmically connected to the source of charges.

7. The apparatus of claim 6 wherein said amplifier has a capacitor coupled between its input and its output which capacitor is equal in value to the measured maximum capacitance of the dielectric structure.

8. The apparatus of claim 3 wherein said capacitance measuring means comprises a phase locking amplifier coupled to a linearizing amplifier and an integrating operational amplifier.

9. The apparatus of claim 3 wherein said applying means comprising a feedback loop between the measuring means and the voltage means.

10. The apparatus of claim 3 wherein said means for determining the location of the centroid of charges in the dielectric comprises a summing circuit having a first input coupled to the charge detector means and a second input coupled to the capacitance measuring means and an output, a first divider circuit having a first input coupled to said charge detector means and a second input coupled to the measuring means and an output, a second divider circuit having a first input coupled to the output of said summing circuit and a second input coupled to the measuring means and an output, and a multiplier having an input coupled to the output of the first divider, an input coupled to the output of the second divider and an output wherein the output of said multiplier is a determination of the centroid of the net distribution of charge in said dielectric structure.

11. An apparatus for determining the location of the centroid of charges in a dielectric structure comprising:

an electrode coupled to the dielectric structure,
a source of charges coupled to the dielectric structure,
voltage means for applying distinct superimposed voltages across the electrode, the structure and the source of charges to cause charges to be injected into the structure from the source, charge detector means coupled to the structure for measuring the amount of charge injected into the structure, capacitance measuring means coupled to the charge detector means for measuring the change in capacitance in the structure caused by the injection of said charges, said capacitance measuring means including means for applying a voltage corresponding to said measured change in capacitance to the electrode, and means coupled to said charge detector means and said capacitance measuring means for determining the location of the centroid of the distribution of charges in the dielectric with respect to the interface between the dielectric and the electrode.

12. An apparatus for determining the thickness of each layer of a dielectric structure having at least two layers of different dielectric comprising:

a source of charge coupled to said structure,
voltage means for applying two distinct superimposed voltages across the structure and the source to cause charges to be injected into the structure from the source charge detector means coupled to the structure for measuring the amount of charge injected into the structure, capacitance-voltage measuring means for measuring the change in capacitance in the structure caused by the injection of said charges, feedback means for applying said measured change in capacitance to the structure as a voltage, and means coupled to said charge detector means and said feedback means for determining the thickness of each of the layers.

13. The apparatus of claim 2 wherein said converting means includes means which electronically satisfies the equation $$[\Delta V_{FB}/(-\Delta q_i/C_o)] (1 + Sm) T_d$$

where
$\Delta V_{FB}$ is the measured change in capacitance detected by the capacitance measuring circuit
$-\Delta q_i/C_o$ is the measured output of the charge detector after the surface of the charge injector has been restored to its original state
$Sm$ is the minimum measured slope of a plot of $[-(\Delta q_i/C_o) - \Delta V_{FB}]$ vs $\Delta V_{FB}$
and
$T_d =$ is the thickness of the thickest dielectric in the structure.

14. The apparatus of claim 1 wherein said injecting means includes an AC signal superimposed on a pulsed DC signal applied across the dielectric to cause charges to be injected into the dielectric from said source and to measure the change in capacitance of the dielectric caused by the injection of the charges.

15. The apparatus of claim 1 wherein said measuring means includes means for determining the capacitance of the structure.

* * * * *